METHOD OF MAKING STATIONARY HEAD FOR MAGNETIC STORAGE MEDIUMS

Original Filed Oct. 11, 1965 2 Sheets-Sheet 1

INVENTOR.
ROBERT A. SCHNEIDER
BY
Jackson & Jones
ATTORNEYS.

March 10, 1970 R. A. SCHNEIDER 3,499,214

METHOD OF MAKING STATIONARY HEAD FOR MAGNETIC STORAGE MEDIUMS

Original Filed Oct. 11, 1965 2 Sheets-Sheet 2

INVENTOR.
ROBERT A. SCHNEIDER
BY
Jackson + Jones
ATTORNEYS.

United States Patent Office 3,499,214

Patented Mar. 10, 1970

3,499,214

METHOD OF MAKING STATIONARY HEAD FOR MAGNETIC STORAGE MEDIUMS

Robert A. Schneider, Arcadia, Calif., assignor, by mesne assignments, to Bell & Howell Company, Chicago, Ill., a corporation of Illinois Original application Oct. 11, 1965, Ser. No. 494,475, now Patent No. 3,417,386, dated Dec. 17, 1968. Divided and this application Oct. 25, 1968, Ser. No. 806,328

Int. Cl. G11b 5/42

U.S. Cl. 29—603 3 Claims

ABSTRACT OF THE DISCLOSURE

This disclosure relates to methods of manufacturing wear resistant magnetic tape heads wherein the pole tips of the head and their supporting structure are made of sendust and a wear resistant non-magnetic alloy respectively.

Figure 1A:
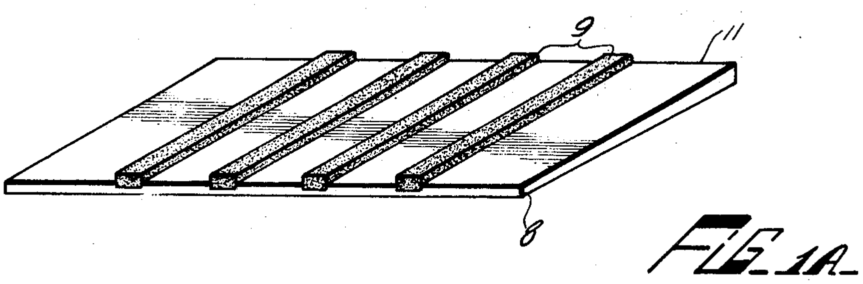

This application is a division of application 494,475, filed Oct. 11, 1965, now Patent No. 3,417,386.

This invention relates in general to a new and improved head for storing and recovering signals on a magnetic storage medium and to a method of fabrication which yields long wear life. In particular, this invention relates to a stationary head and method of fabrication for a contact surface between the head and storage medium, composed of alternate exposed portions of magnetic and non-magnetic materials each having matched high abrasive resistant characteristics.

Stationary heads today are widely employed in various branches of technology which utilizes storage mediums such as tapes, drums, disks, etc. Certain of these stationary heads in the past have generally included a contact surface in which gapped magnetic circuits were exposed for direct contact with the tape or other storage medium. Continual contact with the storage medium introduces friction and abrasion to the head's surface and as a result of such contact these prior art heads are subject to wear, and frequently must be replaced, on occasions after only a few hundred hours of use. These replacements are objectionable because spare equipment must be provided, or the standard equipment is rendered useless during head replacement operations. In addition, the cost of fabricating such heads is high and frequent replacement is, accordingly, uneconomical and undesirable.

Generally, prior art magnetic materials utilized in such heads are composed mainly of nickel with smaller percentages of iron and molybdenum. Such materials, of which there are many varied types each with different magnetic properties, are relatively soft and have a short wear life. In the past, these materials have been held in supports which are normally constructed of another soft easily machinable non-magnetic material such as aluminum or brass. Such prior art heads thus are a combination of two relatively soft materials which are exposed to continual frictional contact with the storage medium. The end result is an extreme wear and short head life for prior art stationary heads.

An iron, silicon, aluminum alloy developed, in the past, has excellent magnetic characteristics and is available in small ingot forms. One particular alloy of this type is referred to as sendust and has a range composition of 7 to 11% silicon, 4 to 7% aluminum and the balance iron. This material has a hardness of approximately Rockwell C–40 to C–50 and its wearability is far in excess of any other known prior art materials for magnetic recording.

Prior to this invention sendust has not been utilized in a stationary magnetic head for direct contact with a storage medium. Prior art support materials and techniques are unavailable because any magnetic material, such as sendust, if supported in soft non-magnetic material would result in a head which exhibits an undesirable washboard pattern. This washboard wear pattern, resulting from the continual contact of the storage medium, would be in the form of uneven troughs at the areas of soft non-magnetic support material, and jagged ridges at the areas of sendust material. Any such head is totally unsatisfactory for reliable and regulated information recovery, because it causes tearing and damage to the storage medium, and distorts tape guiding. Also, the head's life is determined by "wear out" of any surface of the head which contacts the tape and such soft material wears through readily.

I have discovered that sendust material may readily be combined in a contact support surface for a stationary head with a support plate made of a non-magnetic high wear resistant alloy selected from the class of alloys consisting of cobalt-chromium alloys or titanium-aluminum-vanadium alloys.. Such alloys, experiments have shown, have a durability and abrasion resistance that is compatible with the magnetic sendust tips. By compatible it should be understood to mean that such alloy materials wear at substantially the same, or slightly less, than the wear rate for sendust. Thus, use of such alloys as a support and contact surface assures reliable transfer of signals between the storage medium and the magnetic circuit; and, at the same time, provides maximum abrasion resistance and long head life. Further, these alloys may be successfully cut and ground with moderate difficulty, and when machined in this manner hold their shape.

The support plates of this invention are durable and are superior to those of the prior art. Fabrication of a head having a contacting surface of comparable wear characteristics for both the magnetic and non-magnetic materials, in accordance with the principles of my invention, is capable of an extended wear life of approximately 3,000 hours or more at high tape speeds of 120 inches per second and considerably longer at slower tape speeds. This wear life thus represents at least an increase in efficiency of approximately 300 to 500% over known prior art stationary heads.

My invention further includes a method of fabrication which comprises the steps of plating a soft easily machinable slotted rectangular plate pair to a predetermined depth with a non-magnetic cobalt, nickel, indium-copper-nickel, tungsten carbide, tunsten-chromium carbide, or titanium base alloy that is characterized by an abrasive resistance comparable to that of magnetic sendust. These plated surfaces are lap ground with relative ease, as it is well known that materials of this type are relatively easy to grind even though the milling or cutting operations for such materials may be more difficult. This grinding operation removes the raised plated channels and exposes the soft support material. This exposed material is milled out to the depth of the adjacent areas of plated alloy material, and sendust tips are inserted in these milled out channels. The support plate pair with these sendust tips in place are next joined at a proper ridged angle on top of a bracket which houses the remainder of magnetic circuits to be completed by the sendust tips. Once assembled, the untreated, soft, non-magnetic surface of the rectangular plate pair is machined by conventional machining along the ridge until the coated alloy and the sendust material is just below the machined surface. Thereafter the head assembly is subjected to a contour lapping operation which removes the remainder of the soft support plate and develops a contoured ridge with alternate exposed areas of magnetic sendust material and non-magnetic plated alloy material. These exposed alternate material are available for direct contact with the medium and because of their matched wearing characteristics, represent a new and improved head having a wear life superior to any known prior art device.

The foregoing principles and features of this invention may more fully be appreciated by reference to the accompanying drawing in which:

FIG. 1 depicts a new head plate in accordance with the principles of this invention; and FIG. 2 depicts a new head plate and a method of plating to expose alternate areas of magnetic and non-magnetic materials characterized by high abrasion resistance for direct contact with a magnetic medium.

It should be understood that in its broadest sense my invention comprises a pair of tip support plates such as plate 11 of FIG. 1A. Each plate 11 is slotted and the slots are filled with a magnetic sendust material 9. A detailed description of these slotting operations and one possible head fabricating technique is fully discosed in another application filed on even date herewith, assigned to the same assignee.

Reference may be made to this other application if the details of this head fabrication technique are desired. In general, however, a pair of tip support plates having the magnetic sendust tips cemented in place as shown in FIG. 1A, are subjected to a beveling operation along length 8 These beveled tip support plates are bonded to a ridge-shaped surface of a head support housing 6, FIG. 1C, which houses the remainder of the magnetic circuits.

Figure 1B:
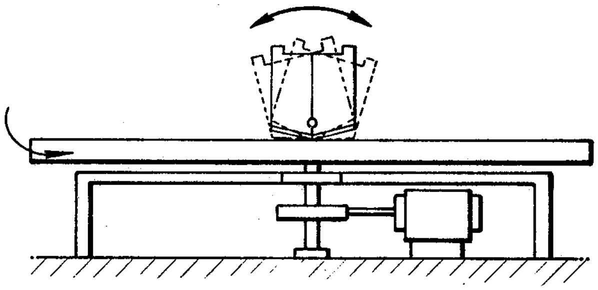

One magnetic circuit is provided for each track of information and each magnetic circuit includes a pair of magnetic tips, one each on opposite sides of a gap in the head structure on the storage medium. A head is assembled in the form shown in FIG. 1C and the gapped ridge 7 is present at the peak of the surface which provide for contact with the magnetic storage medium. This gapped ridge 7 is then contour ground in any one of several well-known grinding techniques, a typical one of which is shown in FIG. 1B. This contour grinding operation of FIG. 1B, exposes portions 5 of the sendust tips, FIG. 1C, which previously were located just beneath the upper surface of the beveled edge 8 of both tip support plates 11 and 12. The contour or radius for this grinding operation is chosen to provide a proper angle for contact with the magnetic storage medium which angle assures reliable signal transfer and reduces tape pressure and wear on the head.

The alloys which are characteristic of the tip support plates 11 and 12 of this invention are generally classified by non-magnetic and corrosion resistant qualities. Of the wear resistant alloys mentioned hereinbefore, two have proved to be particularly applicable to the magnetic head of this invention and these two alloys are a cobalt-base and a titanium-base alloy. The cobalt base alloys include a nominal composition of 42% cobalt, 20% chromium, 13% nickel, 2% molybdenum, 3% tungsten and the balance of smaller percentages of carbon, beryllium, manganese and iron. This composition is only typical and in fact the percentages of nickel and iron may be reduced considerably if corresponding increases in chromium are present. For example, an alternative nominal composition includes 47 to 51% cobalt, 30 to 31% chromium, and 4 to 12% tungsten with the remaining material consisting of iron, nickel, silicon and molybdenum in amounts ranging from 1 to 3%. I have also discovered that a titanium base alloy consisting of 88 to 92% titanium and 5 to 7% aluminum and 3 to 5% vanadium is another wear resistant alloy that is readily machinable and has wear characteristics compatible with the magnetic sendust tips.

Figure 1C:
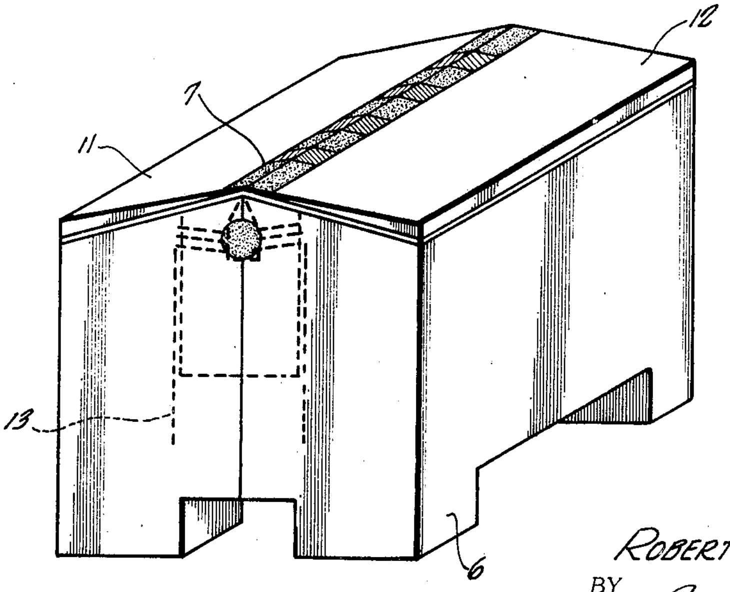

An alternative embodiment of my invention avoids some areas of possible machining difficulties that may be presented by the use of the wear resistant alloy support plates 11 and 12, FIG. 1C, described hereinbefore. In accordance with this alternative embodiment, a soft material support plate is coated with a wear resistant alloy of the classes mentioned hereinbefore. That support plate is thereafter subjected to a method of fabrication and assembly described and depicted in connection with FIG. 2, hereinafter.

Figure 2A:
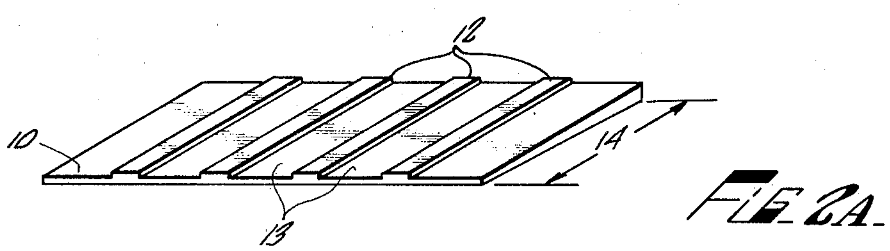
Figure 2B:
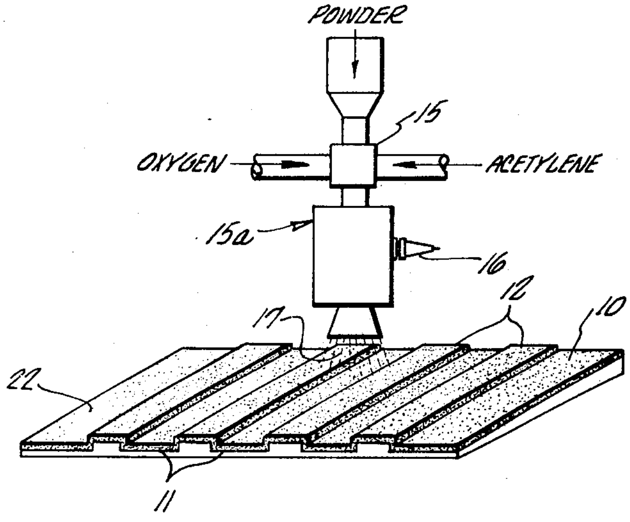

In FIG. 2A one flat rectangular blank 10 is shown. This blank 10, to provide for easy machinability, is chosen of a soft material such as aluminum or brass. Plate 10 has a plurality of parallel slots 13 extending across its width 14. These slots 13 may be milled in plate 10 by any well known machining technique. As shown in FIG. 2A, each pair of alternate slots produces a plurality of raised parallel areas 12 running across the width 14 of plate 10. This milling operation provides as many raised landings 12 as there are information storage tracks on a medium to be read. In the case shown in FIG. 2A, a head plate for a 4-track medium is depicted as a typical example.

Plate 10 with raised landings 12 and channels 13, is next subjected to a coating operation whereby a layer of any of the foregoing wear-resistant alloy is deposited on plate 10. Any well-known coating operation including electroless plating and other chemical plating techniques may be employed at this step in the method of fabrication. For example, in FIG. 1B a typical prior art flame plating apparatus is depicted in diagrammatic form. Numerous so-called flame plating apparatus and techniques are known in the art and any one of such techniques would be satisfactory for this invention. Merely by way of example, if a detailed description is required, reference is made to Patent No. 2,714,563 issued Aug. 2, 1955, to R. M. Poorman et al., on a flame plating technique.

These flame plating operations in general include an apparatus having a mixing chamber 15 wherein oxygen, acetylene and a powdered alloy material are combined in proper amounts. This powdered material is chosen in accordance with the principles of this invention from long-wearing alloys such as the foregoing alloys which have a cobalt or titanium base. Once the proper amount of these materials in powdered form is present in the mixing chamber 15 they are introduced into a second mixing chamber shown as 15A. In this second mixing chamber a high voltage spark is applied by a spark plug 16 which spark ignites the mixture and shoots the heated powder particles from the open end of the gun barrel 7 at high velocity onto the surface of plate 10. This flame plating operation is readily controllable to deposit a layer 22 of any desired depth on the slotted surface of plate 10. This alloy layer 22 is readily controllable and may advantageously be approximately ten to twelve-thousands of an inch thick.

Figure 2C:
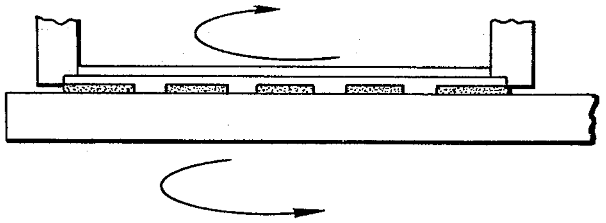
Figure 2D:
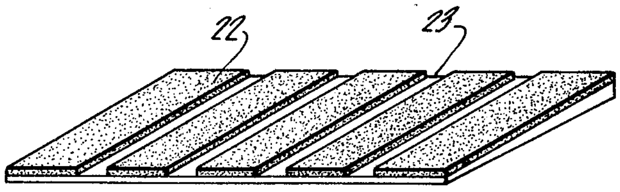
Figure 2E:
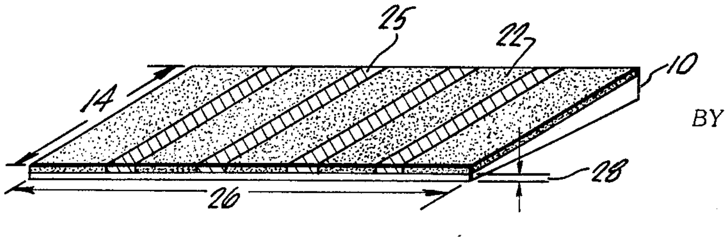

This coated layer 22 of highly wear resistant alloy covers the entire surface of plate 10 and as described hereinbefore this surface has as many raised landings 12 as there are tracks of information on the storage medium. Both this soft machinable support plate 10 and the wear resistant alloy coating 22 are non-magnetic. The next step in the method of this invention is, as shown in FIG. 2C, to remove a portion of these non-magnetic materials by lap grinding the coating of wear resistant material 22 and the raised landings 12, until a flat plane surface is obtained on the treated side of plate 10. This plane surface includes alternating parallel strips of wear resistant alloy plating and portions of the soft non-magnetic support plate material 13. This lap grinding operation may be any one of those well known in the prior art. For example, a typical grinding operation similar to that depicted in FIG. 2C is described in detail in the foregoing referenced patent application.

Thereafter the soft easily machinable plate support material is milled from between the strips of wear resistant alloy. This milling operation is controlled to a depth which is the same as the thickness of the wear resistant alloy layer 22, in the manner shown in FIG. 2D. Each of the recessed channels 23 formed by the milling operation of FIG. 1D are thereafter filled with appropriately sized tips 25 of magnetic sendust material cemented in place in channels 23 in the manner depicted in FIG. 2E. This cement may be epoxy resin or any other suitable bonding agent. This step produces a flat plane surface layer consisting of alternate strips across the width 14 of plate 10 of non-magnetic alloy 22 and magnetic sendust tip material 25 each having matching wear characteristics.

The beveling and contour grinding operations of FIGS. 1B and 1C described hereinbefore in connection with an entire support plate made of wear resistant alloy, may thereafter be utilized to complete the head assembly fabrication. Thus a beveled edge along the length 26 of each one of a pair of tip support plates is provided by matching the untreated side of plate 10. This machining operation involves only the soft support plate material and is therefore readily accomplished with little difficulty and relatively low cost.

In accordance with the method of this invention this beveling operation proceeds only until there remains but a narrow portion 28 of soft support plate remaining above the treated layer of alternate strips of magnetic and non-magnetic materials 25 and 22 respectively. Once the tip support plates have been joined in the manner described hereinbefore in connection with FIG. 1C the gapped ridge 7 is subjected to a contour grinding or lapping operation of FIG. 1B.

It was mentioned hereinbefore that the wear resistant alloy may be ground or lapped more easily than it may be milled or cut. Thus by utilizing the coating operation of this invention, only grinding or lapping operations are involved as far as the wear resistant alloy is concerned. This method thus readily provides a narrow contour of alternate areas of matching wear resistant characteristic materials. This contour runs the entire length of the magnetic head for contact with a storage medium. It is highly wear resistant and thus avoids the disadvantages of prior art heads and achieves a superior contact surface and longer head life.

It is to be understood that the foregoing features and principles of this invention are merely descriptive, and that many departures and variations thereof are possible by those skilled in the art, without departing from the spirit and scope of this invention.

What is claimed is:

1. A method of fabrication of a signal recording and recovery head for a storage medium comprising the steps of:
(a) plating to a predetermined depth the underside of a soft easily machineable non-magnetic plate material with a plurality of parallel strips consisting of a high wear and abrasive resistant non-magnetic alloy;
(b) milling channels to said predetermined depth in the soft unplated material between said plated strips;
(c) fixably inserting gapped magnetic sendust ribbons of said predetermined thickness in the milled out channels;
(d) placing the underside of said plated material and said ribbons on a housing bracket including a plurality of magnetic circuits completed by said gapped sendust ribbons;
(e) grinding a contoured surface for contact with a storage medium in the upperside of said plate material through said soft material to expose alternate areas of gapped sendust ribbon and said plated non-magnetic material.

2. A method of fabrication of a signal storage and recovery head for a storage medium comprising the steps:
(a) housing a number of partial magnetic circuits, one for each signal track, in a housing bracket, said magnetic circuits to be completed by gapped magnetic head tips,
(b) coating parallel strips of predetermined depth of a high wear resistance alloy selected from the class of alloys consisting of cobalt-chromium alloys and titanium-aluminum-vanadium alloys on the underside of a soft, easily machineable non-magnetic plate material,
(c) milling channels to said predetermined depth in the soft unplated material between said strips of high wear resistant alloy,
(d) fixably inserting gapped magnetic sendust tips in said channels,
(e) joining the underside of said plated material with said gapped sendust tips to said housing with said partial magnetic circuits aligned with said tips to complete magnetic signal recording and recovery circuits, and
(f) grinding a contoured surface through the upperside of said soft material to expose alternate areas of said alloy and gapped sendust material for contact with said storage medium.

3. A method of fabrication of a signal recording and recovery head for storage medium comprising the steps of:
(a) slotting a pair of flat rectangular plates to expose as many narrow raised landings across the width of the plates as there are tracks of information for the storage medium;
(b) plating the slotted surface of both rectangular plates to a predetermined depth with a non-magnetic coating having high wear resistance;
(c) grinding away the coated material on the raised landings to form a flat plane surface of alternating parallel strips of coated material and support plate material;
(d) milling out the strips of support plate material to the predetermined depth of the coated material;
(e) cementing magnetic sendust tips having a high wear resistance compatible to the coated material in the milled out channels;
(f) lap grinding a beveled edge along one length of each plate on the surface opposite the slotted surface;
(g) joining the beveled edges in a peaked ridge on a housing bracket, which includes a plurality of gapped magnetic circuits equal in number to the tracks of information for the magnetic storage medium said plurality of gapped circuits being positioned to form complete magnetic circuits with said sendust tips;
(h) grinding a predetermined radius along the peaked ridge to expose alternate areas of said non-magnetic and said magnetic sendust tips for direct contact with a magnetic storage medium.

References Cited

UNITED STATES PATENTS

| | | | |
|---|---|---|---|
| 2,922,231 | 1/1960 | Witt et al. | 340—174 |
| 2,992,474 | 7/1961 | Adam et al. | 179—100.2 X |
| 3,384,954 | 5/1968 | Bradford et al. | 29—603 |

JOHN F. CAMPBELL, Primary Examiner

C. E. HALL, Assistant Examiner

U.S. Cl. X.R.

29—527